United States Patent
Reband et al.

(10) Patent No.: US 10,807,509 B2
(45) Date of Patent: Oct. 20, 2020

(54) VEHICLE FLOOR MAT WITH SUPPORTS FOR IRREGULAR VEHICLE FLOOR

(71) Applicant: THERMOFLEX CORPORATION, Waukegan, IL (US)

(72) Inventors: David A. Reband, Antioch, IL (US); Robert Price, Mettawa, IL (US)

(73) Assignee: THERMOFLEX CORPORATION, Waukegan, IL (US)

(*) Notice: Subject to any disclaimer, the term of this patent is extended or adjusted under 35 U.S.C. 154(b) by 35 days.

(21) Appl. No.: 15/385,601

(22) Filed: Dec. 20, 2016

(65) Prior Publication Data

US 2017/0182920 A1 Jun. 29, 2017

Related U.S. Application Data

(60) Provisional application No. 62/271,952, filed on Dec. 28, 2015.

(51) Int. Cl.
*B60N 3/04* (2006.01)

(52) U.S. Cl.
CPC ............. *B60N 3/048* (2013.01); *B60N 3/044* (2013.01)

(58) Field of Classification Search
CPC ................................. B60N 3/044; B60N 3/048
USPC ...................................................... 296/97.23
See application file for complete search history.

(56) References Cited

U.S. PATENT DOCUMENTS

| | | | |
|---|---|---|---|
| 2,275,575 A | 3/1942 | Vrooman | |
| 4,491,556 A | 1/1985 | Fujii et al. | |
| 6,794,013 B1* | 9/2004 | Iacovelli | B60N 3/044 15/215 |
| 6,933,036 B2 | 8/2005 | Whitaker | |
| 9,248,769 B2 | 2/2016 | Price et al. | |
| 2011/0076457 A1 | 3/2011 | Reichwein et al. | |
| 2012/0324805 A1 | 12/2012 | Reichwein et al. | |
| 2013/0136899 A1 | 5/2013 | Milella, Jr. et al. | |
| 2013/0260083 A1* | 10/2013 | Price | B29C 45/14786 428/95 |
| 2014/0103681 A1* | 4/2014 | MacNeil | B60N 3/044 296/97.23 |

FOREIGN PATENT DOCUMENTS

| | | |
|---|---|---|
| GB | 2171902 A | 9/1986 |
| JP | S 63-64841 A | 3/1988 |
| JP | H 09-175248 A | 7/1997 |

* cited by examiner

*Primary Examiner* — Joseph D. Pape
*Assistant Examiner* — Dana D Ivey
(74) *Attorney, Agent, or Firm* — Greer, Burns & Crain, Ltd.

(57) ABSTRACT

A vehicle floor mat is provided for placement on a vehicle floor having surface irregularities, and includes a floor mat body having an upper surface, a peripheral edge, and a bottom surface. The bottom surface has an integral depending support structure provided with a variable height such that the shape of the support structure complements the irregularities in the vehicle floor. Upon the vehicle floor mat being placed on the vehicle floor, said support structure engages the irregularities and upper floor mat surface is generally level.

11 Claims, 6 Drawing Sheets

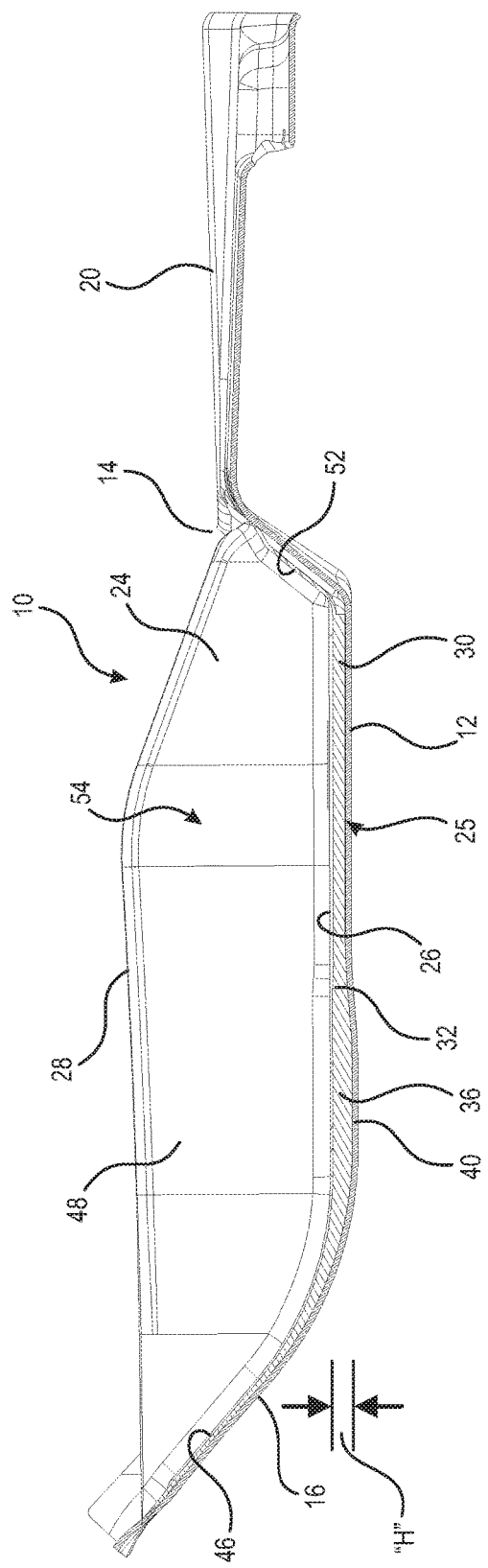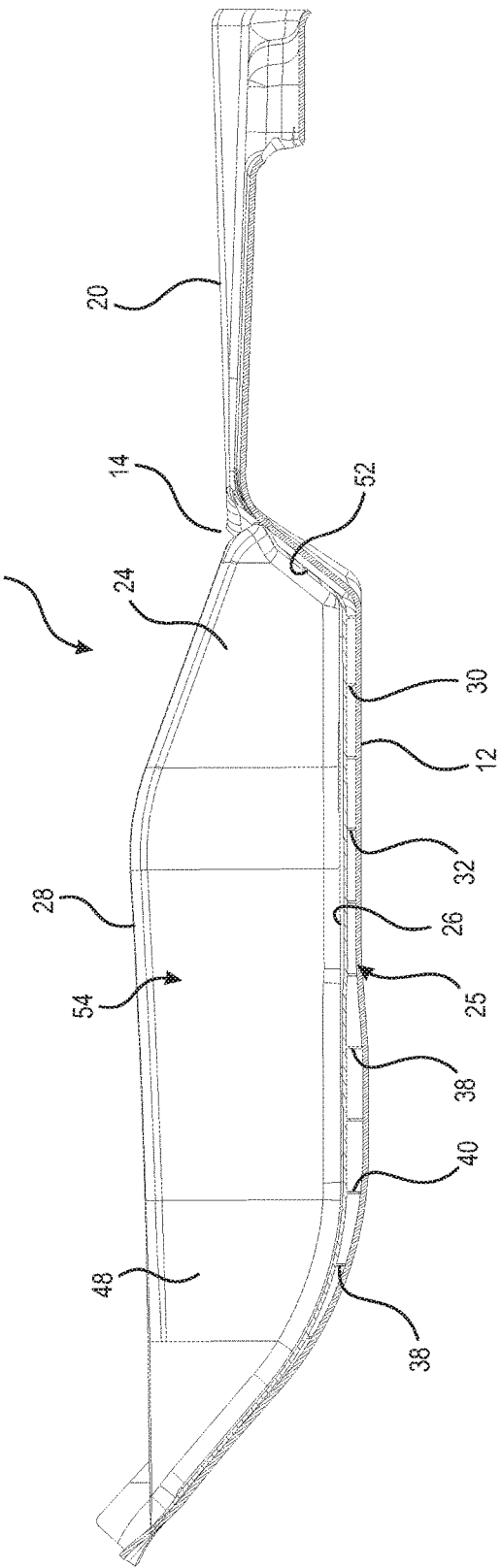

VEHICLE FLOOR MAT WITH SUPPORTS FOR IRREGULAR VEHICLE FLOOR

RELATED APPLICATION

This application claims 35 U.S.C. 119 priority from U.S. Provisional Patent Application No. 62/271,952 filed Dec. 28, 2015.

BACKGROUND

The present invention relates to protective mats for flooring, and more specifically to such mats designed for use in vehicles for protecting vehicle carpeting from dirt, water damage and the like.

Conventional automotive vehicles, and particularly passenger vehicles, are manufactured with foot wells in front of the passenger seats for placement of driver and passenger feet while seated in the vehicle. To reduce vehicle weight and maintain structural integrity, vehicle floors, including foot wells, are configured using sheet metal formed with corrugations or other shapes. These shapes result in an uneven floor.

In the past, manufacturers provided carpet padding such as foam and the like beneath the carpeting to fill in the gaps or recesses formed by the corrugations. However, cost and weight reduction measures have resulted in a decrease in the use of such padding. Accordingly, in many vehicles, the placement of carpeting upon the vehicle floor fails to mask the irregular sheet metal surface, and results in an unsightly appearance.

Thus, there is a need for a vehicle floor mat that addresses the above problems.

SUMMARY

The above-listed needs are met or exceeded by the present improved vehicle floor mat which covers the vehicle floor and accommodates structural floor irregularities, while providing a generally level floor surface for the passengers' feet. This is achieved by providing a support structure extending below a lower surface of the floor mat to form a complementary shape with irregularities in the floor, such that upon the floor mat being placed in the vehicle foot well, an upper surface of the floor mat will be generally level. Another feature of the present mat is that it covers the entire foot well.

More specifically, a vehicle floor mat is provided for placement on a vehicle floor having surface irregularities, and includes a floor mat body having an upper surface, a peripheral edge, and a bottom surface. The bottom surface has an integral depending support structure provided with a variable height such that the shape of the support structure complements the irregularities in the vehicle floor. Upon the vehicle floor mat being placed on the vehicle floor, said support structure engages the irregularities and upper floor mat surface is generally level.

BRIEF DESCRIPTION OF THE DRAWINGS

FIG. 5 is a cross-section taken along the line 5-5 of FIG. 4;

FIG. 6 is a cross-section taken along the line 6-6; and

DETAILED DESCRIPTION

Figure 1:
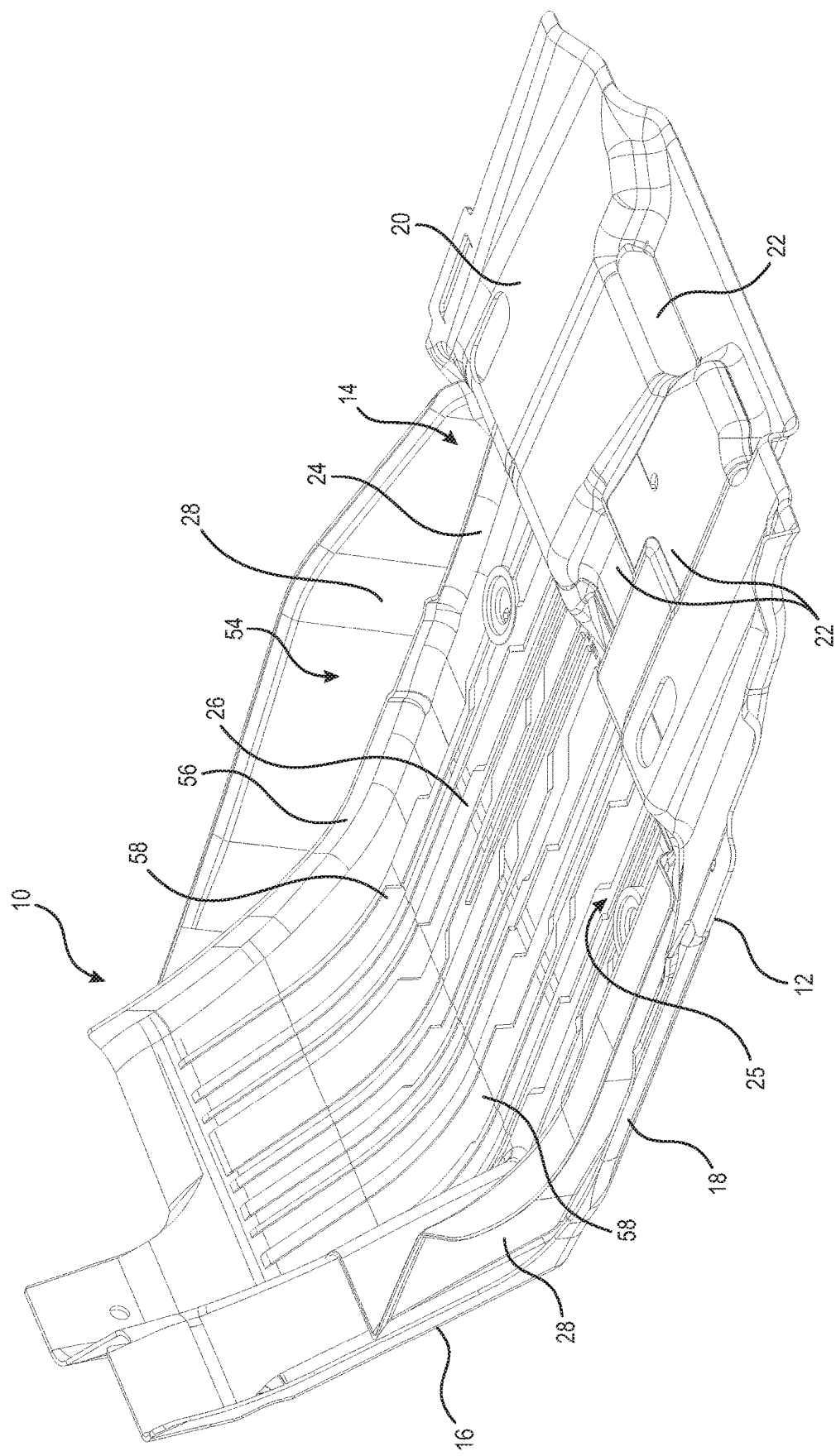
FIG. 1 is a top perspective view of the present floor mat placed on a vehicle floor foot well.

Referring now to FIG. 1, the present floor mat is generally designated 10, and is constructed and arranged for placement upon a vehicle floor 12 located in a vehicle foot well 14. Conventional passenger vehicles typically have four foot wells, each having a distinct shape. Thus, manufacturers of vehicle floor mats need to provide distinctly shaped mats for each foot well in each model of vehicle. Typically, floor mats are provided in sets, of two front and two rear floor mats. Besides the floor 12, the foot well 14 includes a front wall 16, sidewalls 18 and a seat mount surface 20.

Figure 7:
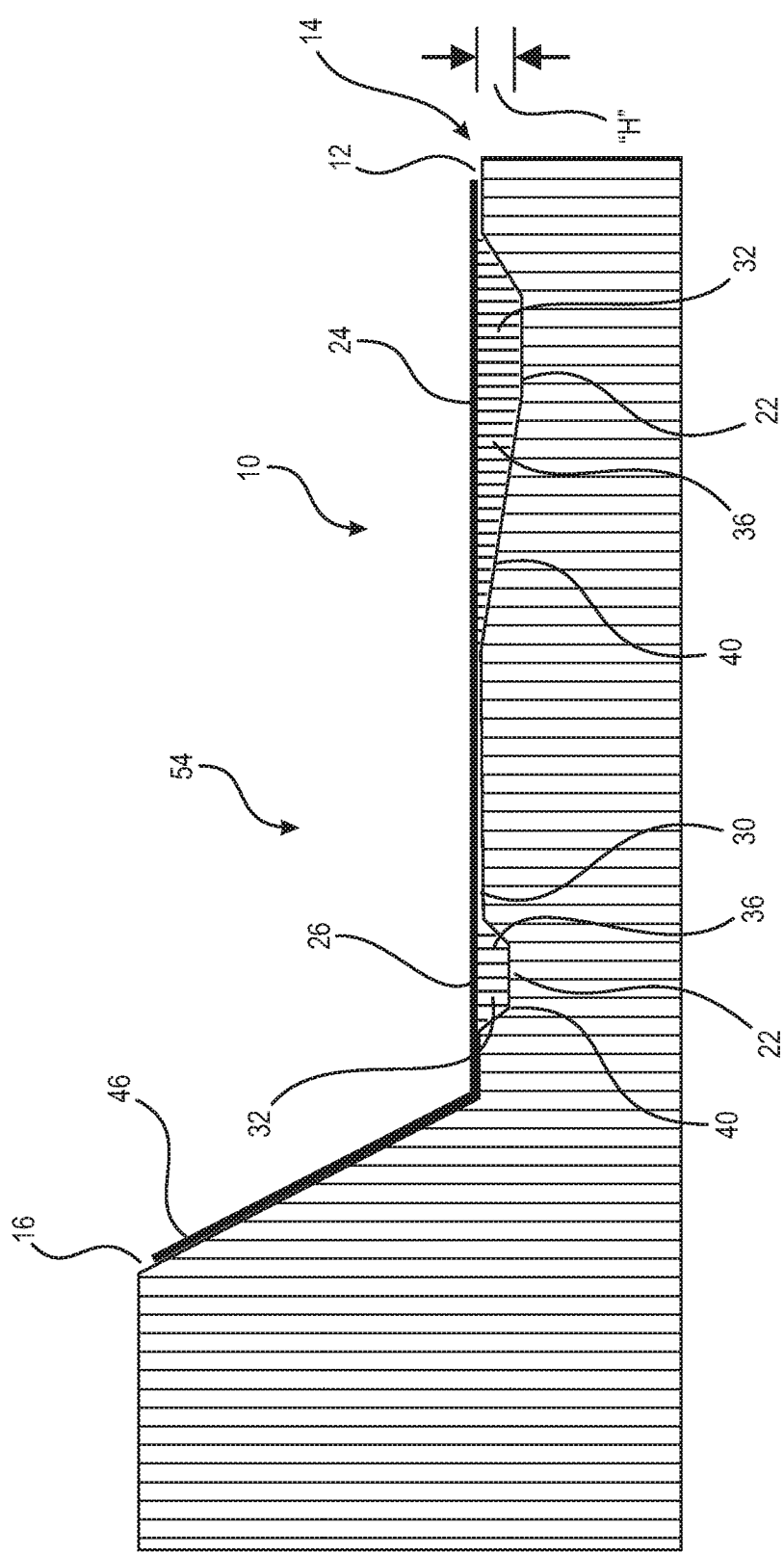
FIG. 7 is a schematic cross-section of the present floor mat on a vehicle floor.

As seen in FIGS. 1 and 7, the vehicle floor 12 and the seat mount surface 20 are not planar, and are provided with structural irregularities 22 including depressions and cavities formed in the respective sheet metal by stamping or the like to increase structural strength, provide mounting points for vehicle components, for facilitating assembly and for other reasons known to skilled practitioners in the automotive manufacturing art. Due to an increasing trend on the part of manufacturers to refrain from providing foam padding between the floor and any carpeting, there is a need for providing a floor mat that can accommodate the floor irregularities 22 in an aesthetically appealing manner.

Referring now to FIGS. 1-7, the present floor mat 10 includes a floor mat body 24 having a bottom wall 25, an upper surface 26, a peripheral edge 28, and a bottom surface 30. In the preferred embodiment, the floor mat 10 is made by injection molding; however other formation techniques are contemplated as known in the art. A feature of the present floor mat 10 is that upon being placed in the foot well 14, the upper surface 26 is generally level. This feature is achieved by providing the bottom surface with an integral depending support structure 32 having with a variable height such that the shape of the support structure complements the irregularities in the vehicle floor. Upon the vehicle floor mat 10 being placed on the vehicle floor 12, the support structure 32 engages the irregularities 22 and the upper floor mat surface 26 is generally level. Another feature of the present mat 10 is that it covers the entire foot well 14.

Figure 3:
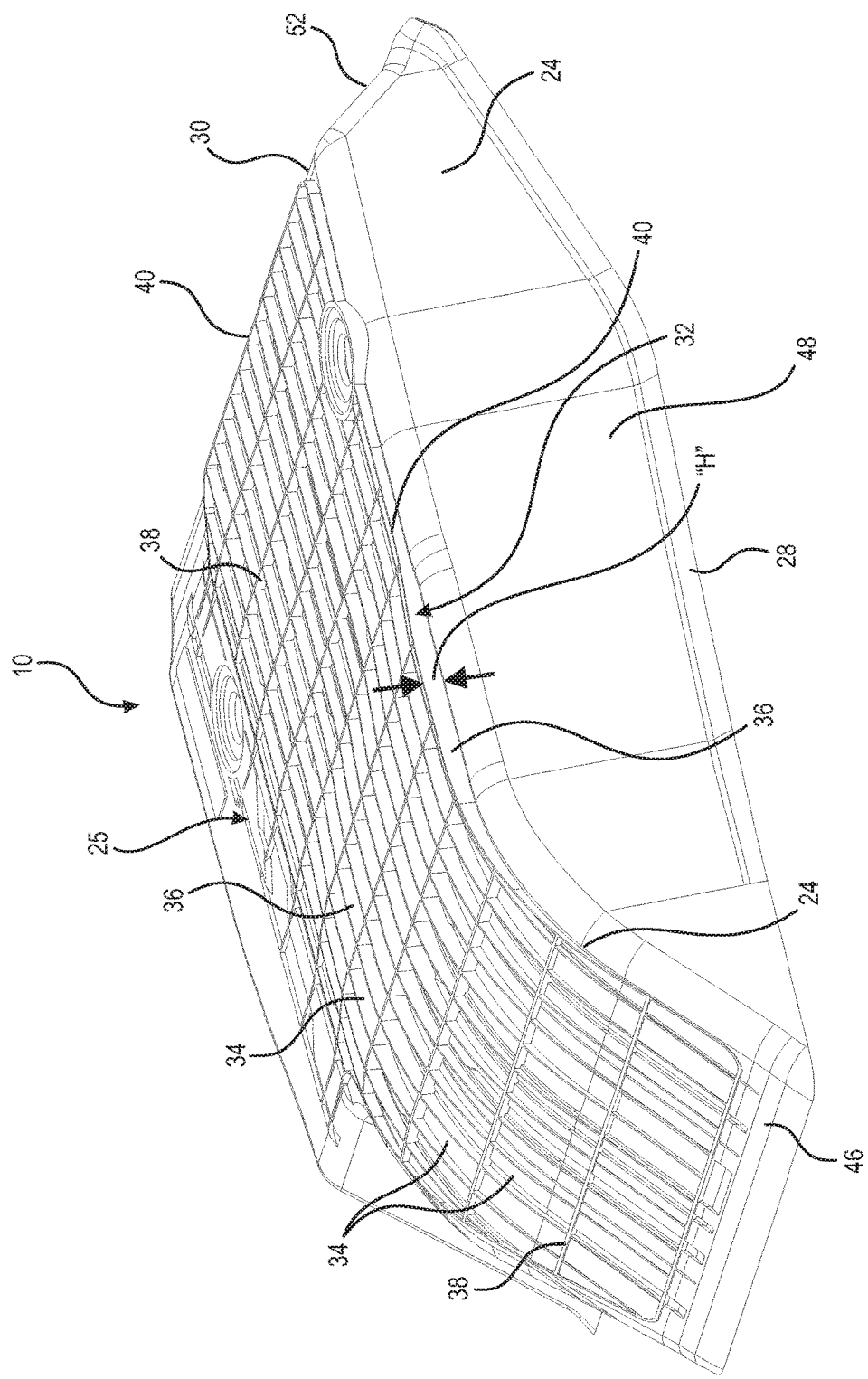
FIG. 3 is a bottom perspective view of the floor mat of FIG. 2.

As seen in FIG. 3, the preferred embodiment of the present support structure forms a grid defining rectangular apertures 34 using a plurality of spaced, generally parallel axial ribs 36 and transverse ribs 38. The spacing of the ribs 36, 38 is designed to suit the application so that the floor mat 10 adequately supports the feet of the passenger or driver. Preferably, the support structure 32 is configured for resisting deformation in the range of 5 pounds or more loading. Also, while rectangularly arranged ribs 36, 38 are shown, it is also contemplated that the support structure or grid 32 is optionally created using other geometric shapes, including but not limited to hexagons, pentagons, triangles, squares, etc. It will be seen from FIGS. 3, 5 and 6 that a height "H" of the support structure 32 varies with along at least one of a length and width of the bottom surface 30. These variations are designed to complement the irregularities 22 of the vehicle floor 12 so that the upper mat surface 26 remains generally level upon placement of the mat in the foot well 14.

Referring now to FIGS. 5, 6 and 7, a lower edge 40 of the ribs 36, 38 is preferably curved as needed to complement the floor irregularities 22. As seen in FIG. 7, depending on the particular configuration of the vehicle floor 12, the support structure 32 is optionally provided with isolated depending regions 42, 44 for vehicles where the vehicle floor irregularities 22 include a plurality of depressions, and the support structure 32 includes formations for filling the depressions so that the upper floor mat surface 26 is generally level when the mat is placed on the vehicle floor. Thus, depending on the design of the particular vehicle floor 12, the height "H" of the support structure 32 may range from 0-2 inches.

Figure 2:
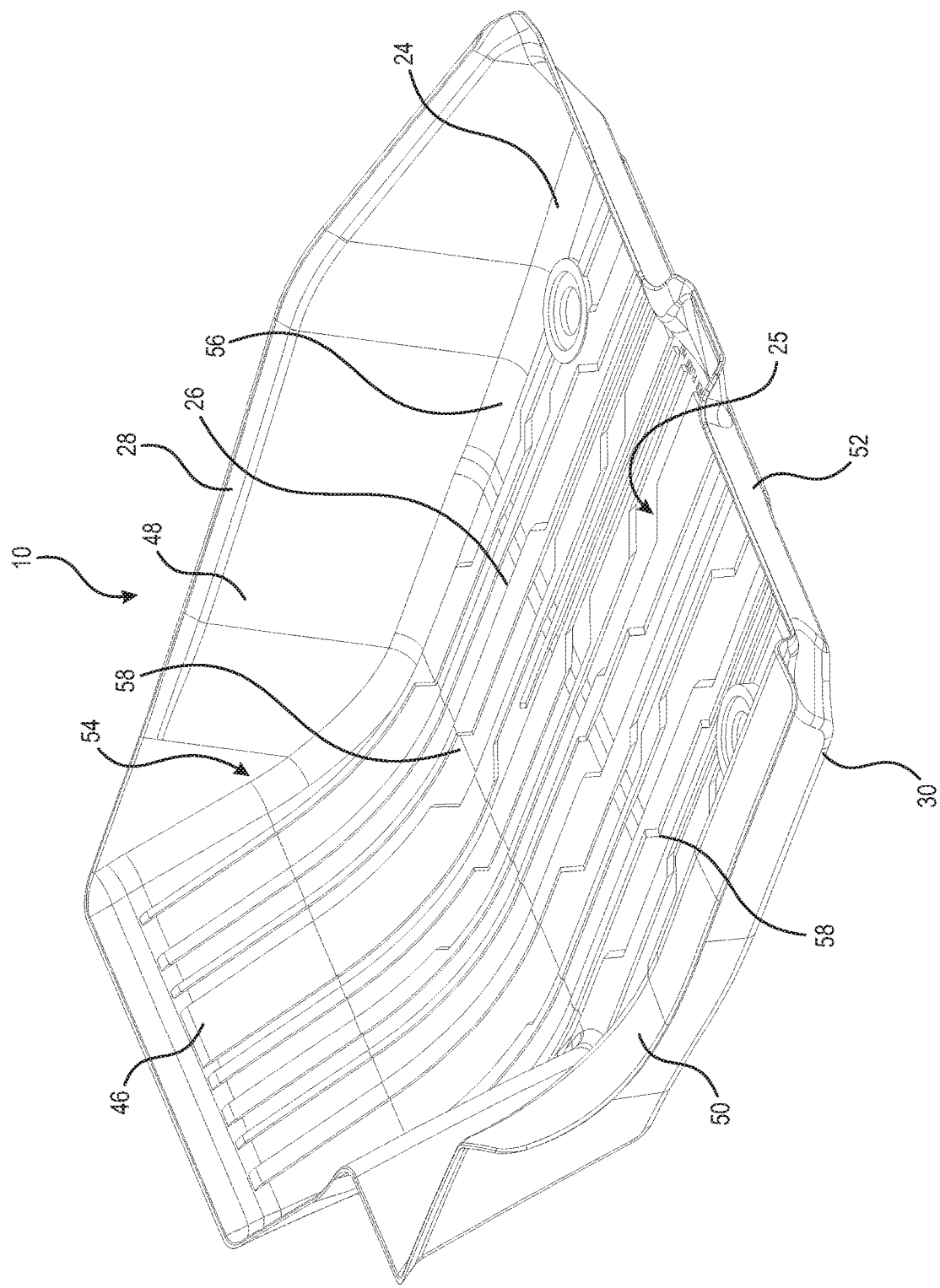
FIG. 2 is a top perspective view of the present floor mat.

Referring now to FIGS. 2 and 3, the mat 10 is constructed such that the peripheral edge 28 is formed as at least one generally vertically projecting wall extending from the bottom wall 25, specifically a front wall 46, an outer wall 48, and inner wall 50 and a rear wall 52. These walls combine to define a general bowl-shape for the floor mat 10 and define a space 54 for receiving the feet of the rider or driver. In addition, it is preferred that the outer wall 48 is structurally enhanced, such as through the use of a supplemental lip 56 for providing additional thickness which adds support to the mat 10.

Figure 4:
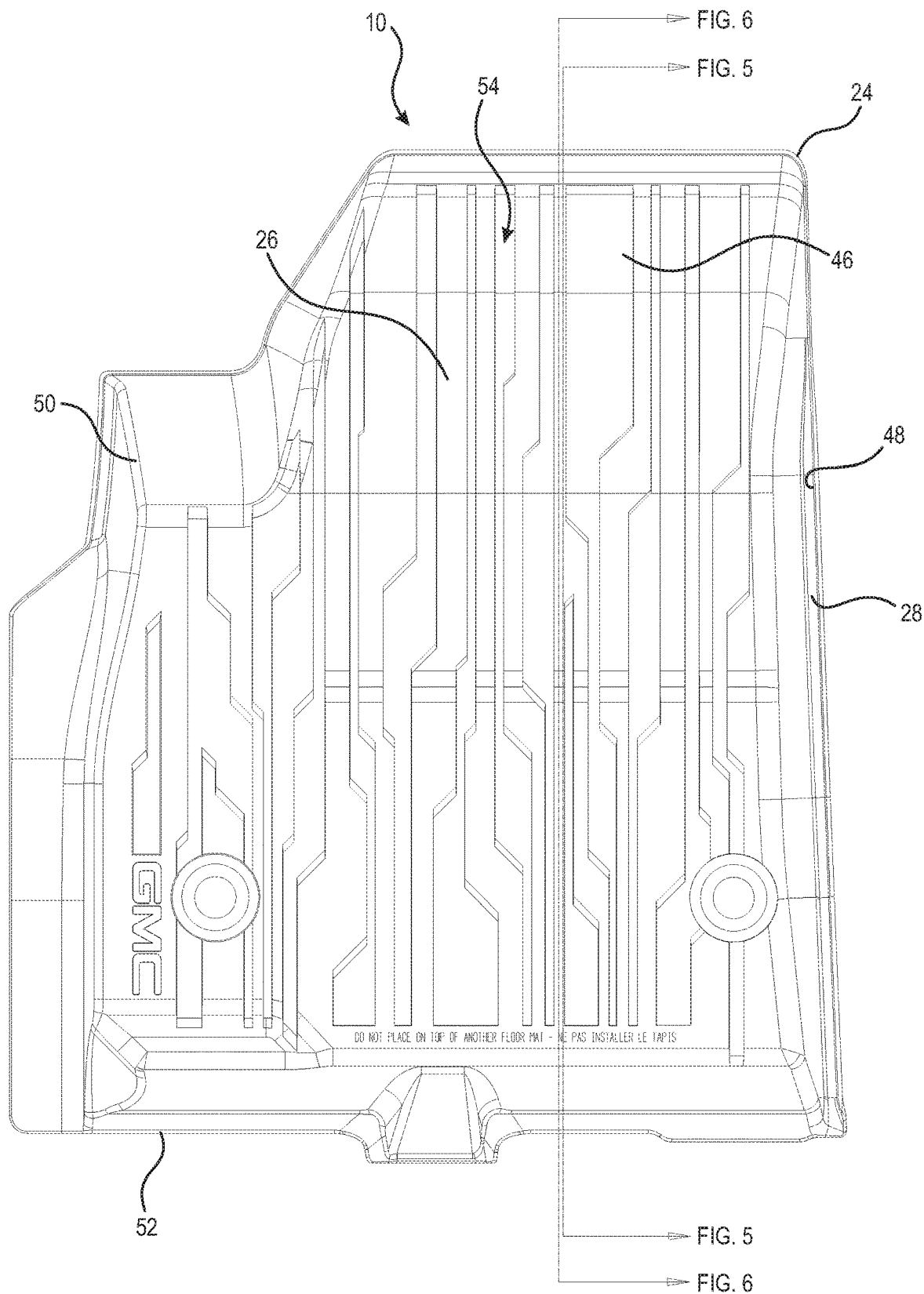
FIG. 4 is a plan view of the floor mat of FIG. 2.

Referring now to FIGS. 1, 2 and 4, as is known in the art, the upper surface 26 is provided with at least one vertically projecting gripping formation 58 in the form of ribs or walls to prevent the user's feet from slipping on the mat when wet.

While a particular embodiment of the present vehicle floor mat with supports for irregular vehicle floor has been described herein, it will be appreciated by those skilled in the art that changes and modifications may be made thereto without departing from the invention in its broader aspects and as set forth in the following claims.

The invention claimed is:

1. A vehicle floor mat for placement on a vehicle floor having surface irregularities, the floor mat comprising:
   a floor mat body having a bottom wall, an upper surface, and a bottom surface, and a front wall extending upwardly from said bottom wall, said upper surface and said bottom surface extending along said bottom wall and said front wall;
   said bottom surfaces of said bottom wall and said front wall having an integral depending support structure provided with a variable height such that the shape of said support structure complements the irregularities in the vehicle floor, said depending support structure extending from said bottom surface of said bottom wall and said front wall, said support structure defining a plurality of apertures;
   upon said vehicle floor mat being placed on the vehicle floor, said support structure engages the irregularities in the vehicle floor and said upper surface of said bottom wall is generally level.

2. The floor mat of claim 1, wherein said support structure includes a plurality of axial ribs and a plurality of transverse ribs that form a grid.

3. The floor mat of claim 1, wherein said support structure has a height that varies along at least one of a length and a width of the floor mat body.

4. The floor mat of claim 1, wherein said support structure has a curved lower surface that complements the vehicle floor irregularities.

5. The floor mat of claim 1, wherein said support structure forms isolated depending regions.

6. The floor mat of claim 1, wherein the vehicle floor irregularities include a plurality of depressions, and said support structure includes formations for filling the depressions so that said upper floor mat surface is generally level when said mat is placed on the vehicle floor.

7. The floor mat of claim 1, wherein a side of said mat body includes at least one generally vertical wall extending from said bottom wall.

8. The floor mat of claim 7, wherein said at least one generally vertical wall extends to said front wall.

9. The floor mat of claim 1, wherein said floor mat body is generally bowl-shaped.

10. The floor mat of claim 1, wherein said upper surface is provided with at least one vertically projecting gripping formation.

11. The floor mat of claim 1, wherein said floor mat body is made of a single material layer.

\* \* \* \* \*